Dec. 29, 1953  R. D. LYNN  2,664,542
MAGNETIC WELL LOGGING APPARATUS
Filed July 24, 1952  4 Sheets-Sheet 2
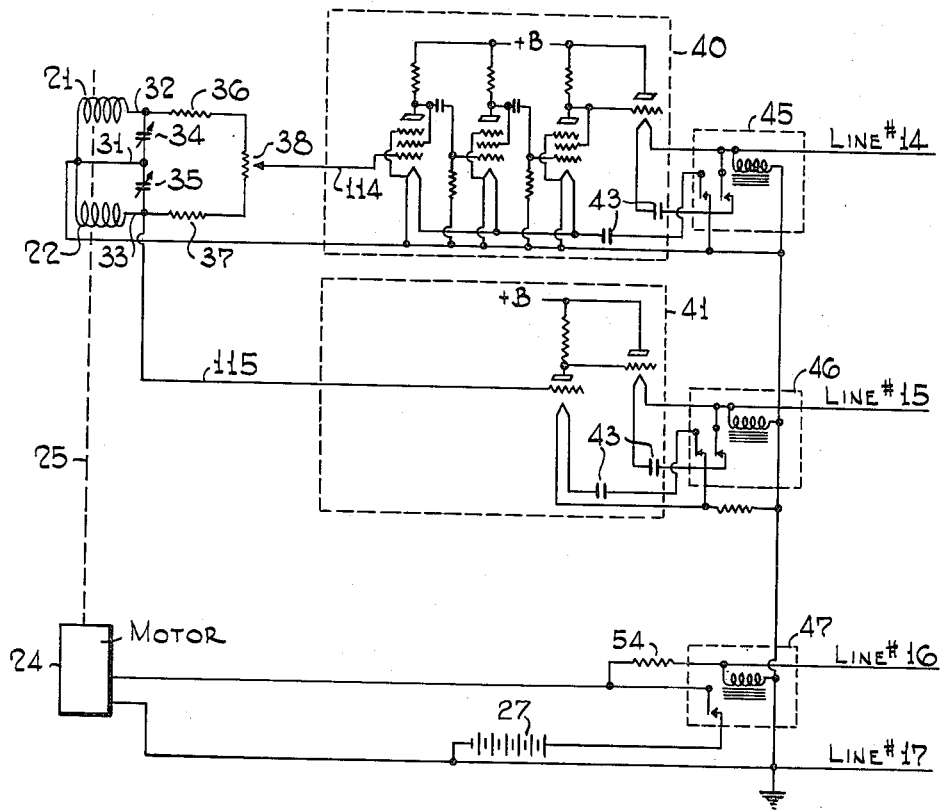
F1G.-3
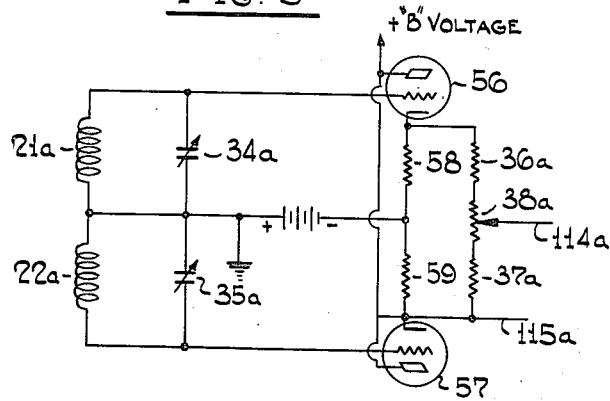
F1G.-4
Ralph D. Lynn Inventor
By W. O. Heilman Attorney

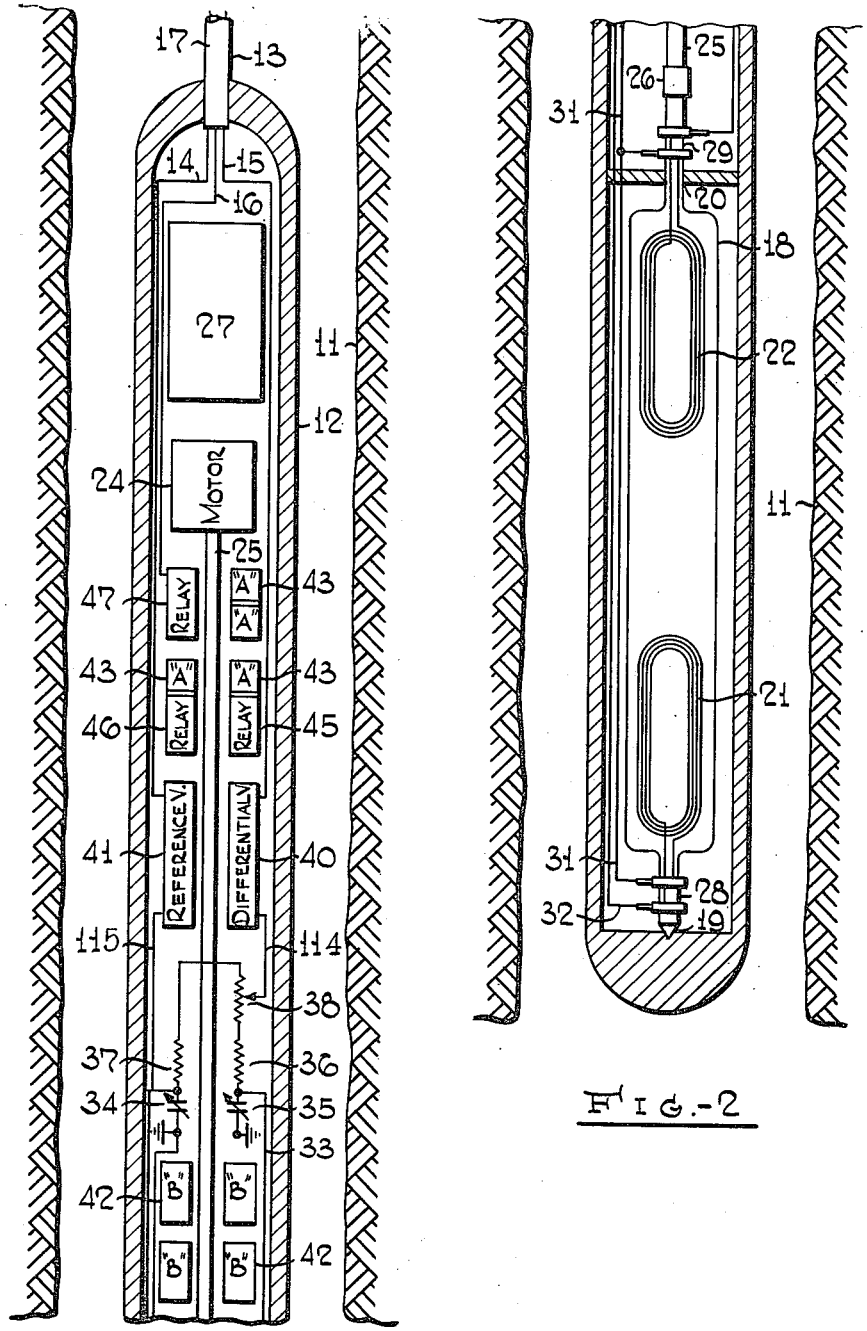

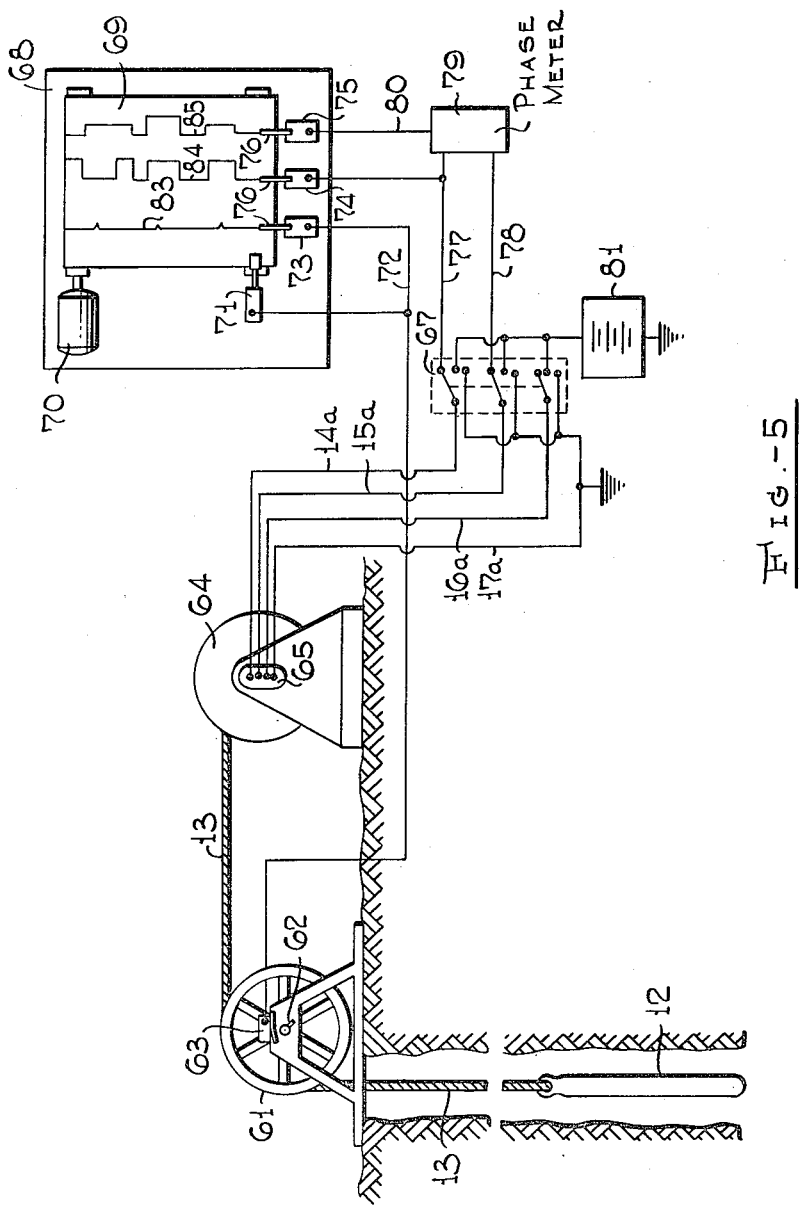

Dec. 29, 1953         R. D. LYNN                2,664,542
            MAGNETIC WELL LOGGING APPARATUS
Filed July 24, 1952                         4 Sheets-Sheet 4

Ralph D. Lynn  Inventor
By W. O. Heilman  Attorney

Patented Dec. 29, 1953

2,664,542

UNITED STATES PATENT OFFICE 2,664,542

MAGNETIC WELL LOGGING APPARATUS

Ralph D. Lynn, Tulsa, Okla., assignor to Standard Oil Development Company, a corporation of Delaware Application July 24, 1952, Serial No. 300,694

5 Claims. (Cl. 324—8)

This invention relates to an improved apparatus for logging well bores to ascertain the probable nature of the strata encountered from variations in magnetic phenomena along the well bore. More particularly it relates to apparatus for determining variations in both the intensity and direction of the vertical gradient of the horizontal magnetic component of the earth's field.

This application is a continuation-in-part of application Serial No. 227,137, filed May 19, 1951, which is now abandoned.

Various methods have been devised for logging oil well bore holes in order to obtain information as to the nature of the different layers of earth adjacent the well bore. Such information is valuable in that similar data from other bore holes can be correlated to ascertain subsurface contours. The different well logging methods all involve some form of more or less continuous measurement of chemical or physical properties along the length of the well bore and are of such great value that considerable effort has been expended in their development and improvement.

One method of well logging involves measurement of the variations in magnetic properties of the formations traversed by the bore hole. Many types of apparatus have been devised for this purpose, some being designed for measuring the magnetic fields that naturally exist in the bore hole and others being of the type that generate an induced magnetic field and then measure the effect of the various strata on the induced field.

In accordance with the present invention an apparatus is provided for lowering a bore hole and measuring the vertical gradient of the horizontal magnetic intensity both as to magnitude and as to direction relative to magnetic north. As used here the term "vertical" means substantially parallel to the axis of the bore hole, which normally would be within a few degrees of a true vertical. The term "horizontal" as used here would then mean a direction perpendicular to vertical as herein defined.

The horizontal magnetic intensity in a bore hole will be affected by the susceptibility of the material around the hole, due to the existence in most latitudes of a substantial horizontal component in the earth's magnetic field. Thus in moving vertically through subsurface strata of various magnetic susceptibilities the horizontal intensity in the bore hole will also change. In this connection the horizontal component of the earth's field may reasonably be assumed to change but slowly, if at all, with distance up and down the bore hole. This variation in the horizontal intensity may be in magnitude only, if the formations are isotropic in susceptibility for various directions about the vertical axis, or may include or consist only of changes in direction if anisotropy exists in some strata. The horizontal intensity in the bore hole can also be affected by residual magnetization of the formations around it. Such remanent magnetization is known to exist in some earth materials and may have almost any direction. In some cases this direction of magnetization is believed to be controlled or affected by the direction of magnetic north at the time when the beds were deposited. In any event this factor will change from bed to bed in moving vertically along the bore hole. One use of such variations in direction of remanent magnetization is to provide "time markers" in otherwise homogeneous beds, since it is accepted that the direction of magnetic north has varied widely with time in the past.

From the above it is apparent that measurements of the vertical variations (in both magnitude and direction) of the horizontal intensity in a bore hole will yield information of value. This information is particularly useful in making correlations between one hole and another, although data concerning the nature of the beds traversed should also emerge.

Since the magnetic effects mentioned are rather small, and since the boundaries between strata in the subsurface are commonly fairly sharp (i. e. the boundary or transition zones occupy little space vertically) a gradient method of measurement is distinctly superior to any attempt to measure the magnetic field in the hole directly. For one thing, earth field variations with time substantially cancel out. The horizontal component of the magnetic intensity is best for measurement in that it can be shown that it will indicate boundaries between beds more sharply than a vertical intensity method. If in addition to the magnitude of the horizontal intensity variation the direction is also measured, an additional parameter related to anisotropy, dip, remanent magnetization, or some combination of these, is available for study.

Thus it is an object of the present invention to provide a novel form of appasatus for logging the vertical magnetic gradients existing in a bore hole.

It is another object of the invention to provide an apparatus for logging a bore hole magnetically with two substantially identical coils spaced vertically from each other in the bore hole and rotated about a vertical axis to generate signals from which both the direction and magnitude of the vertical gradient of the horizontal magnetic field can be determined.

It is a particular object of the invention to provide means for balancing out slight differences between the two substantially identical coils in an apparatus of the type described.

In accordance with this invention a magnetic well logging device is provided that consists essentially of two substantially identical coils that are adapted for rotation at uniform speed, on a common vertical shaft, the position of one coil being above the position of the other coil. The voltage generated by either coil is representative of the horizontal component of the magnetic field at its position. If the two coils are placed on the shaft such that their effective planes are coincident, and the voltages produced by the two coils are combined in opposition, then the resulting difference voltage is representative of the difference in the horizontal components of the magnetic field at the two coil positions.

If the horizontal components at the two levels of the coils are treated as vectors the difference voltage developed will be proportional in magnitude to the vector difference between the components. These principal vectors will be very closely parallel to the horizontal component of the earth's magnetic field. The angle between the principal vectors and the vector representing the difference voltage between the coils can be ascertained from the phase angle between the difference voltage and the voltage developed by one of the coils, as will be explained hereinafter.

The nature and objects of the invention will be more fully understood from the ensuing description when taken in conjunction with the accompanying drawing in which:

Figures 1 and 2 are vertical sectional views of an apparatus constituting one embodiment of this invention, Figure 2 being a lower continuation of Figure 1, the apparatus being shown in place in a bore hole;

Figure 3 is a diagram of one form of down-the-hole circuit for use in the instrument of Figures 1 and 2;

Figure 4 is a circuit showing an alternative arrangement for balancing the coils;

Figure 5 is a diagrammatic illustration of suitable surface equipment for raising and lowering the apparatus in the bore hole and for recording the data obtained.

Figure 6:
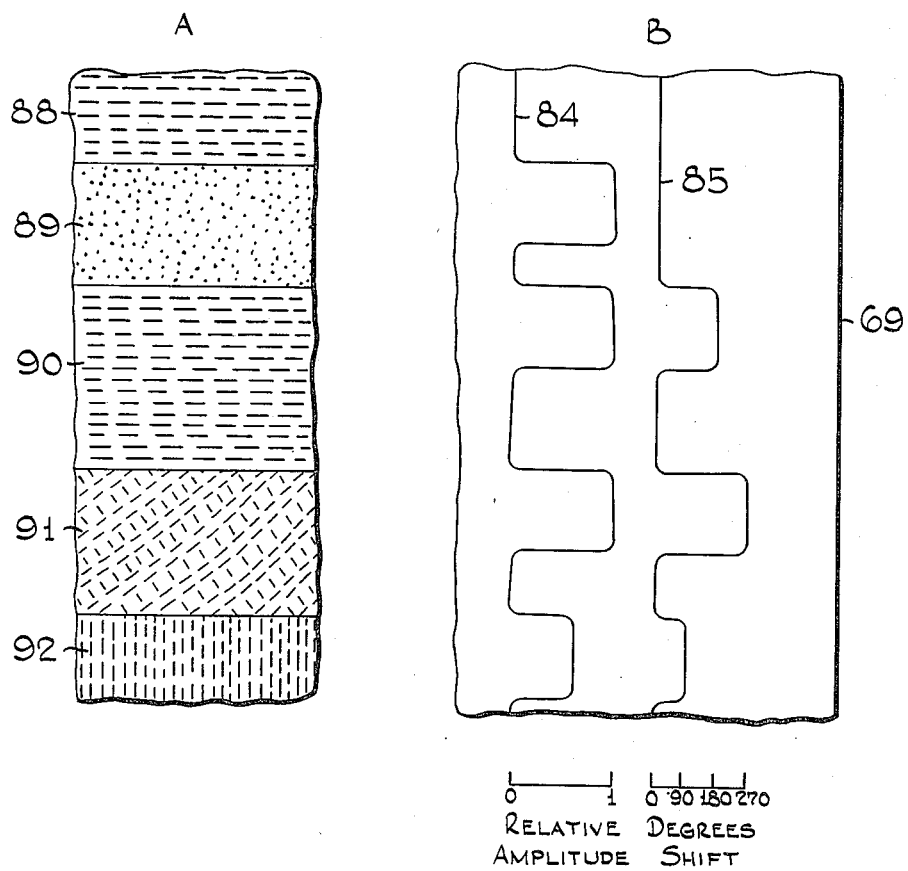
Figure 6 is a representative sample of a typical record obtained with the recording apparatus.

Referring now to Figures 1 and 2 a suitable form of apparatus is shown in vertical section in place in a bore hole. The apparatus is contained within a suitable housing 12, at least the lower portion of which is non-magnetic, and is supported in the bore hole 11 by a cable 13 having a plurality of conductors 14, 15 and 16 and an outer conducting sheath 17. Disposed within the lower portion of housing 12 and rotatably supported by bearings 19 and 20 is an elongated framework 18 to which are rigidly fixed two substantially identical coils 21 and 22, the coils being so placed that their axes are perpendicular to the axis of rotation of framework 18 and also so that the effective planes of these coils coincide. For the purpose of rotating the framework a motor 24 is suitably supported within the upper portion of housing 12 and has coupled thereto an elongated shaft 26 which in turn is coupled to framework 18 by coupling member 26. Preferably motor 24 is an electric motor fed by batteries 27 placed within the housing. Alternatively, if desired, motor 24 may comprise a spring motor or similar means for turning framework 18. Coil 21 is electrically connected to leads 31 and 32 through a slip ring assembly 28. Similarly coil 22 is connected electrically to leads 31 and 33 through slip ring assembly 29.

It will thus be seen that coils 21 and 22 are connected in parallel opposition. This arrangement is preferred over series opposition, direct series connection or direct parallel connection. With a direct parallel connection of the coils the effects of differences of coil resistances and coil inductances are difficult to eliminate. Furthermore the relatively large coil current obtained with the latter connection disturbs the magnetic field, which is not desired. With a series connection the effects of distributed capacity are difficult to eliminate.

A preferred feature of the invention is the provision of a mixing circuit into which the two coils are connected in order to balance out slight differences between the two coils since it is practically impossible to wind two coils so that they will be perfectly identical. This circuit comprises two fixed resistors 36 and 37 and a potentiometer 38, the two coils being connected to the two sides of the potentiometer through leads 32 and 33. For convenience in wiring the circuit, lead 31 is connected to ground. Resistors 36 and 37 have practically equal resistance values and these values are selected to be very much greater than the total impedance of either of the coils. By selecting such high resistance values the alternating current through the coils is limited and hence the effects of coil resistance and coil inductance on the difference voltage are minimized.

To obtain an absolute balance the mixing circuit is adjusted by setting potentiometer 38 so that a zero A. C. voltage will result between lead 115 (tied to the center tap of the potentiometer) and ground when the coils are rotated in a uniform magnetic field. As it is difficult to place two coils on the framework 18 so that their planes will coincide within the accuracy required for the instrument, small variable capacitors 34 and 35 are placed across leads 31 and 32 and 31 and 33 respectively and their capacitance values adjusted so that when the coils are rotated in a uniform magnetic field the A. C. voltages between leads 31 and 32 and between leads 31 and 33 will be exactly 180° out of phase. After the foregoing adjustments are made with the coils rotating in a uniform field this portion of the device is ready for use, so that when the apparatus is lowered into a bore hole and the coils rotated, any A. C. voltage obtained between lead 114 and ground will be representative of the difference of the horizontal components of the magnetic field at the positions of coils 21 and 22 in the bore hole. The A. C. voltage across lead 115 and ground, which will be the A. C. voltage induced in coil 22 alone, will serve as a magnetic north reference for recording the phase angle of the difference voltage.

In order that the voltages produced between lead 114 and ground and lead 115 and ground may be adequately utilized for well logging purposes, it is preferred that they be suitably amplified before transmission through cable 13 to the recording equipment at the earth's surface. Thus the voltage in lead 114 is fed into difference voltage amplifier 40, the voltage in lead 115 is fed into reference voltage amplifier 41, and the amplified voltages are then transmitted through leads 14 and 15 in cable 13.

Amplifiers 40 and 41 may be of conventional design and may, for example, be of the type shown in Figure 3, which is a schematic diagram showing a circuit arrangement that may be utilized for turning the amplifiers on or off as desired and for starting or stopping the motor remotely. Difference voltage amplifier 40 is indicated schematically to have three amplifying stages plus an output stage of the direct coupled cathode follower type. It is preferred that conventional filtering be used between each stage to reduce the response of the amplifier to frequencies above the rotational frequencies of the coils. The filters have been omitted from the diagram for simplification since they do not enter into the present description of the operation of the circuit. A sensitive relay 45 serves as the cathode resistor for the output stage of the amplifier. The contacts of this relay connect A battery 43 to the filaments of the vacuum tubes in the amplifier, the cathode current of the output stage being sufficient to keep the relay contacts closed. Thus it will be seen that the amplifier may be turned on remotely merely by applying a D. C. plus voltage to line 14 with respect to ground, i. e. with respect to sheath 17 of cable 13. When the amplifier has warmed up to the point where the tubes become conducting, the applied D. C. voltage may be removed and relay 45 will remain closed until line 14 is shorted to ground at which time relay 45 will open. Thus it is a simple matter to turn amplifier 40 on and off from the surface of the ground. In a similar manner reference voltage amplifier 41 may be turned on and off by applying a D. C. voltage between line 15 and sheath 17 whereupon relay 46 will close and remain closed when the amplifier has warmed up, until it is again opened by shorting line 15 to ground. Line 16 may similarly be employed to close relay 47 so that current from battery 27 will operate motor 24. The amount of current through the coil of relay 47 is limited by resistor 54. Motor 24 is turned off by shorting line 16 to ground.

In place of the mixing circuit shown in Figure 3, an alternative circuit may be employed as illustrated diagrammatically in Figure 4 wherein elements corresponding to those in Figure 3 are given the same reference numeral followed by the letter a. Coils 21a and 22a are connected respectively to the grids of vacuum tubes 56 and 57 which are operated as cathode follower stages. Although these tubes are indicated as triodes, other types of vacuum tubes will serve equally well. Cathode resistors 58 and 59 may be approximately the same size as resistors 36a and 37a although this is not essential. As described in connection with Figure 3, balance is attained by setting potentiometer 38 so that a zero A. C. voltage will result between lead 14a and ground when the coils are rotated in a uniform magnetic field. The circuit of Figure 4 has an advantage over that of Figure 3 in that it practically eliminates all current through the coils and thus minimizes temperature effects, i. e. the effect of temperature changes on the resistance of the coils. For all practical purposes, however, the circuit of Figure 3 is entirely satisfactory provided resistors 36 and 37 have resistances that are very much larger than the total impedance of the coils. For example if each of the coils has a D. C. resistance of 140,000 ohms, resistors 36 and 37 may be selected to have 8 megohms resistance.

One form of suitable surface equipment for raising and lowering the apparatus in the bore hole and for recording the data obtained is shown schematically in Figure 5. The apparatus within housing 12 is supported in the bore hole on cable 13, the latter being pulled over measuring wheel 61. The measuring wheel may be of a convenient diameter so that an integral number of feet of cable, for example, 5 or 10 feet, will pass over it for one rotation of the wheel. Affixed to wheel 61 or to its axle is a pin 62 which is so placed that on each rotation of the wheel the pin will actuate switch 63. Cable 13 is wound onto reel 64 which is provided with suitable moving contacts within box 65 to establish contact between the ends of the conductors in cable 13 and leads running to recording instrument 68 through switch 67. Recorder 68 is provided with a moving chart 69 which is fed through the instrument by means of motor 70. The latter may be either a constant speed motor or a selsyn type motor tied in with the rotation of measuring wheel 61 so that chart 69 will be fed at a rate proportional to the rate of travel of the apparatus in the bore hole. A plurality of galvanometers 73, 74 and 75 are contained within recorder 68 and each galvanometer is provided with a recording means 76 for producing traces on moving chart 69. One of the galvanometers 73 is tied to switch 63 through line 72 and serves to record each rotation of wheel 61 as an aid in determining the depth of the apparatus at any particular point on the record. A mechanical counting device may be made an integral part of switch 63 and its numerical count recorded on the chart periodically by the operator. Alternatively switch 63 may be made to actuate a separate counting device to indicate the depth of the apparatus in the hole. As an added refinement, switch 63 can also be made to actuate a numbering stamp 71 adapted to record the depth in feet directly on chart 69.

For convenience in identification, the leads leaving box 65 are designated by the numerals 14a, 15a, etc. corresponding to the conductors with which they are electrically connected in cable 13. It will thus be seen that the sheath 17 of the cable is grounded through lead 17a and the three conductors 14, 15 and 16 are tied into a multiple contact switch 67 having three switch positions. In the lowermost position of the switch each of the conductors will be tied to ground; in the middle position of the switch each of the conductors will be tied to potential source 81, and in the uppermost position conductors 14 and 15 will be tied to leads 77 and 78 and conductor 16 will be in an open circuit. Thus switch 67 can be used to apply a potential to amplifiers 40 and 41 and to relay 47 as described in connection with Figure 3. In the uppermost or operating position of switch 67 the signals from conductors 14 and 15 will be fed into recorder 68, impulses from amplifier 40 thus being fed directly to recording galvanometer 74. Impulses from amplifiers 40 and 41 are both fed into phase meter 79 whose output is tied through lead 80 into recording galvanometer 75.

Thus trace 84 will be a record of the potential differences set up between coils 21 and 22 and trace 85 will be a record of the phase angle between the difference voltage of the two coils and the voltage developed by coil 22. Preferably phase meter 79 is of the type that will permit recording of substantially 360° of phase angle relationship on a single trace. For example, there may be employed a trigger tube phase meter circuit such as that developed by Florman and Tait of the National Bureau of Standards as described in Electronics, June 1949, page 162.

The nature of the record obtained is illustrated diagrammatically in Figure 6. To facilitate the description of the manner of interpreting the chart, two views are shown in Figure 6, view A showing five representative subsurface strata placed alongside the traces which may be produced from such strata, the traces being shown in view B. Also for simplicity, trace 83 is omitted from chart 69 in view B. Of the strata illustrated in view A, some differ in magnitude of the horizontal component of the magnetic field and others differ in the direction of the horizontal component. In this example it is assumed that the magnitude of the horizontal component of the magnetic field is the same in strata 88, 90 and 91, greater in stratum 92 and greatest in stratum 89. Also, it is assumed that the directions of the horizontal component of the magnetic field in strata 88, 89, 90 and 92 are parallel and the direction in stratum 91 differs by a small angle. Thus strata 88 and 90 have identical characteristics and are therefore given the same type of line shading in view A.

Since in the example given stratum 89 has a greater horizontal component than stratum 88, the amplitude trace 84 will show a voltage difference as soon as the lower coil 21 reaches stratum 89. As soon as both coils 21 and 22 are alongside stratum 89 the amplitude trace will return to zero but will again shift as stratum 90 is encountered. Although stratum 90 and the adjacent stratum 91 have the same magnitude of horizontal component the amplitude trace will shift when the interface is traversed by the coils because of the difference in the direction of the components in the two strata. Also when the interface between stratum 91 and 92 is traversed, trace 84 will shift because of the difference in horizontal component and trace 85 will shift because of the difference in direction of the horizontal component.

In general, it may be stated that when there is no angular difference in the direction of the horizontal component between two adjoining layers, the indicated phase angle on trace 85 will be either zero or 180°, depending on whether the lower or upper layer has the greater field magnitude. When there is no magnitude difference between the two layers but there is a difference in the direction of the horizontal component, trace 85 will show either 90° or 270° phase difference. Where there is a difference both in magnitude and direction of the magnetic components the phase angle indicated by trace 85 will be of some odd value other than 90°, 180°, 270°, or 360°. Actual determination of the direction of the horizontal components in the various strata involves trigonometric calculations of the data recorded on the traces.

It is to be understood that the embodiments of the invention described and illustrated are by way of example only and that the invention is not to be limited thereto, the scope of the invention being defined by the following claims.

What is claimed is:

1. An apparatus for logging a bore hole comprising a case adapted to be lowered into the bore hole, a supporting framework mounted for rotation about a vertical axis in said case, means for rotating said framework, a pair of substantially identical coils supported by said framework and spaced vertically from each other, said coils lying in essentially the same plane, means connecting said coils in parallel opposition, means for determining the difference voltage generated by said coils upon rotation, means for determining the phase angle between said difference voltage and the voltage generated by one of said coils upon rotation, and means for recording the variations in said difference voltage and in said phase angle in correlation with depth of the apparatus in a bore hole.

2. Apparatus according to claim 1 including a mixing circuit associated with said means connecting said coils in parallel opposition whereby absolute matching of said coils is effected.

3. Apparatus according to claim 2 wherein said mixing circuit and said means connecting said coils in opposition comprise a first variable capacitor connected across one of said coils, a second variable capacitor connected across the other of said coils, a pair of fixed resistors, and a potentiometer, each of said resistors connecting one side of said potentiometer to one side of each of said coils, said resistors having essentially equal resistance values, said resistance values being much greater than the total impedance of either of said coils, and a common conductor connecting the other side of each of said coils together, the output from said coils and said mixing circuit being obtainable from the center tap of said potentiometer and from said common conductor.

4. Apparatus according to claim 2 wherein said mixing circuit and said means connecting said coils in opposition comprise a first variable capacitor connected across one of said coils, a second variable capacitor connected across the other coil, a common conductor connecting one side of each of said coils together, a pair of vacuum tubes with the control grid of one of said tubes connected to the remaining side of one of said coils and the control grid of the other tube connected to the remaining side of the other coil, a pair of cathode resistors each connecting the cathode of its respective tube to said common conductor, a pair of fixed resistors and a potentiometer, each of said resistors connecting one side of said potentiometer to one of said cathodes, the output from said coils and from said mixing circuit being obtainable from the center tap of said potentiometer and from said common conductor.

5. Apparatus according to claim 2 including at least one amplifier within said case connected to the output from said mixing circuit, said amplifier including an output stage of the cathode follower type, the cathode resistor for said output stage comprising the coil of a relay whose contacts are placed in the filament circuits of said amplifier, whereby said amplifier may be turned on remotely by impression of a direct current voltage on the output of said cathode follower.

RALPH D. LYNN.

References Cited in the file of this patent

UNITED STATES PATENTS

| Number | Name | Date |
|---|---|---|
| 2,359,894 | Brown et al. | Oct. 10, 1944 |
| 2,436,039 | Fay | Feb. 17, 1948 |
| 2,519,094 | Zuschlag | Aug. 15, 1950 |

FOREIGN PATENTS

| Number | Country | Date |
|---|---|---|
| 27,440 | India | Jan. 4, 1946 |